US 8,054,192 B2

(12) United States Patent
Grigsby et al.

(10) Patent No.: US 8,054,192 B2
(45) Date of Patent: Nov. 8, 2011

(54) ACTIVITY PATTERN BASED BATTERY CHARGING ALERTS FOR MOBILE DEVICES

(75) Inventors: Travis M. Grigsby, Austin, TX (US); Frank L. Jania, Chapel Hill, NC (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 12/203,264

(22) Filed: Sep. 3, 2008

(65) Prior Publication Data

US 2010/0052930 A1    Mar. 4, 2010

(51) Int. Cl.
*G08B 21/00* (2006.01)
*G08B 5/22* (2006.01)
*H02J 7/00* (2006.01)
*H04M 1/00* (2006.01)

(52) U.S. Cl. ......... 340/663; 340/6.1; 320/127; 320/132; 320/136; 455/569.2

(58) Field of Classification Search .................... None
See application file for complete search history.

(56) References Cited

U.S. PATENT DOCUMENTS

| 5,754,029 | A | 5/1998 | Mann et al. |
| 6,710,578 | B1 * | 3/2004 | Sklovsky ........................ 320/127 |
| 7,349,722 | B2 * | 3/2008 | Witkowski et al. ......... 455/569.2 |
| 7,548,767 | B2 * | 6/2009 | Kim et al. ...................... 320/132 |
| 2001/0015635 | A1 * | 8/2001 | Leppo et al. .................. 320/116 |
| 2003/0227390 | A1 * | 12/2003 | Hung et al. ................. 340/636.1 |
| 2006/0214638 | A1 * | 9/2006 | Chen et al. .................... 320/132 |
| 2007/0205745 | A1 * | 9/2007 | Chen et al. .................... 320/136 |

* cited by examiner

*Primary Examiner* — Jennifer Mehmood
*Assistant Examiner* — Fekadeselassie Girma
(74) *Attorney, Agent, or Firm* — Cantor Colburn LLP; Libby Toub

(57) ABSTRACT

A method for providing activity pattern based battery charging alerts for mobile devices, the method includes: monitoring usage patterns of a mobile device; determining periods of activity and inactivity for the mobile device's usage; creating an activity log detailing the determined periods of activity and inactivity; monitoring levels of available battery charge for the mobile device; correlating the levels of available battery charge with the activity log; and generating a charging advisory alert in response to at least one of: an available battery charge dropping below a threshold value prior to a period of device inactivity, or toward the end of a period of activity.

1 Claim, 2 Drawing Sheets

ACTIVITY PATTERN BASED BATTERY CHARGING ALERTS FOR MOBILE DEVICES

BACKGROUND

This invention relates generally to communication via wireless electronic devices, and more particularly to a method and system for activity pattern based battery charging alerts for mobile devices.

Mobile communication devices, such as cellular phones, have become a central communication tool for both business and personal use. Competitive pressures and multiple billing options have lowered the subscriber cost of operation of mobile communication devices. In many instances, the mobile or cellular phone has replaced the traditional landline phone as a person's primary communication device. Advanced mobile communication devices offer not only voice services, but also text messaging and Internet access. Video and gaming applications are also now available on many mobile devices and service networks As portable communication and electronic devices have continued to evolve their level of sophistication and abilities to carryout a myriad of applications have progressed as well. Initially, a portable electronic device was dedicated to voice communication, such as a cell phone, or to basic computing functions and scheduling, such as a personal digital assistant (PDA). However, the present generation of portable devices has combined computing and voice communications in a single unit, while offering additional features of data communication over the Internet, delivery of multimedia content (video/audio), as well as gaming functions. The increased functionality of the present generation of portable devices has increased their usage throughout the user's day, and placed additional energy demands on the portable device's power source. Despite the increased energy demands, the continued miniaturization of these devices has continued to reduce the amount of space allocated to the portable device's power sources. Furthermore, despite advances in materials that have improved electronic device efficiency, and that have allowed for increased energy storage per unit area, the user demands placed on portable electronic devices has continued to outpace the ability to power the device for extended periods of time. For example, cell phones normally have a maximum of 2 to 4 hours of talk time between a required recharge, while other applications on the cell phone such as Internet access or playing a pre-recorded audio, such as a stored MP3, decrease the amount of talk time considerably below the maximum.

SUMMARY

Embodiments of the present invention provide a method for providing activity pattern based battery charging alerts for mobile devices, the method includes: monitoring usage patterns of a mobile device; determining periods of activity and inactivity for the mobile device's usage; creating an activity log detailing the determined periods of activity and inactivity; monitoring levels of available battery charge for the mobile device; correlating the levels of available battery charge with the activity log; and generating a charging advisory alert in response to at least one of: an available battery charge dropping below a threshold value prior to a period of device inactivity, or toward the end of a period of activity.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
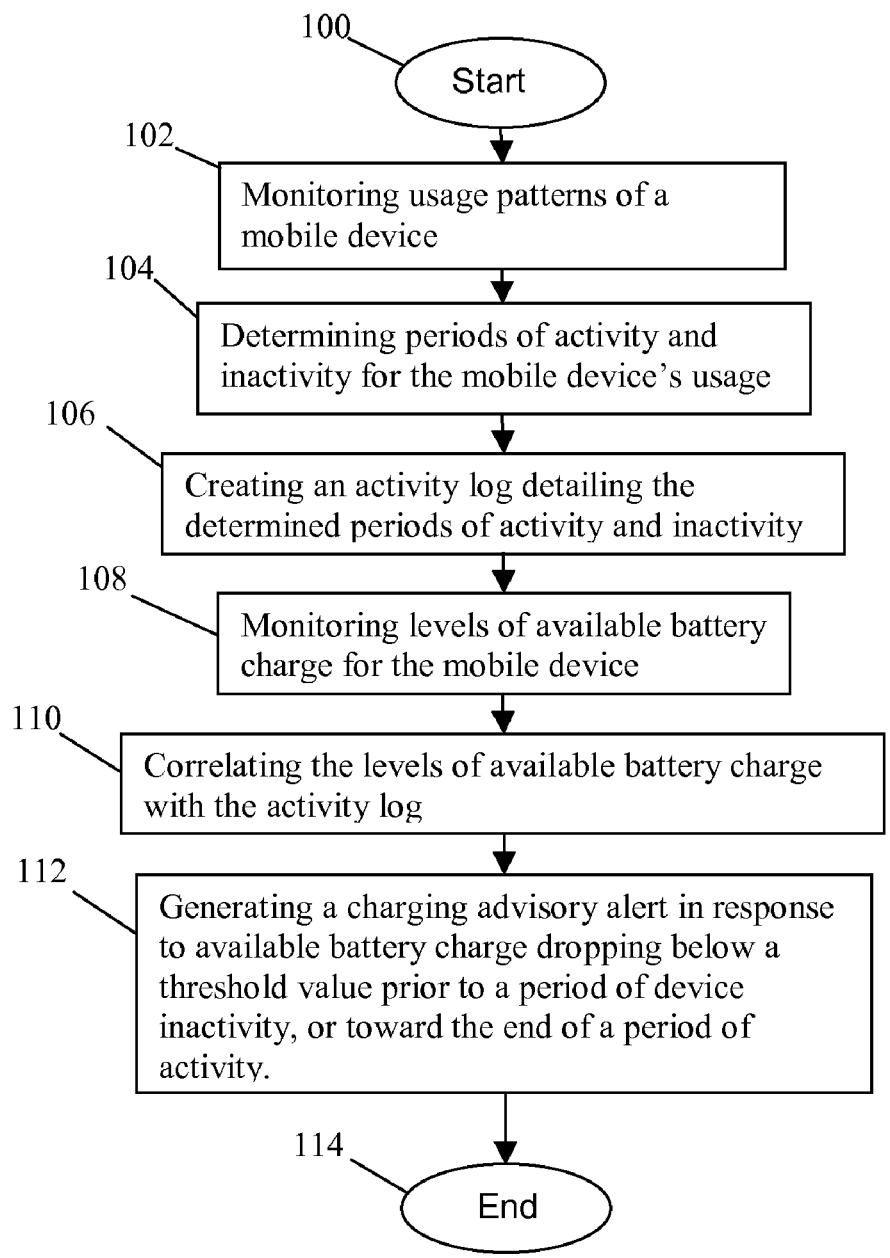
FIG. 1 illustrates a flow chart for providing activity pattern based battery charging alerts for mobile devices according to embodiments of the invention.

The detailed description explains the preferred embodiments of the invention, together with advantages and features, by way of example with reference to the drawings.

DETAILED DESCRIPTION

The widespread adoption of mobile communication devices has led to a significant increase in the use of mobile devices for the purpose of both business and personal communication. Presently employed power management techniques, such as switching electronic devices into power saving and standby modes after a predetermined amount of dormancy, or switching off screens after initiating a phone connection, have contributed to extending device operation between required recharging. However, many of today's applications, such as streaming video and Internet browsing, require constant display as well as a continuous radio frequency (RF) connection. Therefore, existing power management techniques have become inadequate to address the electronic device power consumption profiles that are increasing faster than their power supply profiles.

A common scenario faced by many users of portable communication and electronic devices is for their devices to run out of power or battery charge while the devices are unattended, and the returning user finding the device to be non-operational when the user requires the device for use.

Typically, a mobile communication device goes through a predictable daily cycle of use and disuse that corresponds with a user's level of activity and downtime, such as when they are asleep. However, even during a user's downtime their mobile communication device will continue to drain its battery. Even though a user's downtime is a convenient time to charge a mobile communications device's battery, the user must either remember to look at their device before they retire to sleep, or estimate whether the device requires charging, thereby avoiding a needless recharging cycle that may potentially shorten the batteries life, and diminish the batteries future charging capacity.

Embodiments of the invention monitor usage patterns of mobile devices, and determine periods of device inactivity. In the event a determined period of device inactivity is approaching, embodiments of the invention may suggest that the user charge their device, and determine whether the device will experience a critical level of discharge during the inactive period.

In embodiments of the invention, a user's mobile communication device either tracks its own usage to establish a usage log, or relies on a system level monitor to establish a device usage log. A system level usage log may utilize a service that tracks call logs from a phone service provider. The activity tracking at the device or system level is used to determine periods of activity and inactivity. Embodiments of the invention monitor the remaining charge level of the battery either at the device level or at the system level. The system monitors the device's battery state by periodically contacting the device for updates to a system server. In embodiments of the invention, the current battery charge level is correlated with the device's activity log, to determine whether a charging advisory alert should be provided to the device user.

In embodiments of the invention, the charging advisory alert may be issued prior to a period of device inactivity, or toward the end of a period of activity. In embodiments of the invention, the charging advisory alert may be provided by the device itself, or via instant message (IM), short messaging service (sms) or electronic mail (email) to an alternative device. In an embodiment a set top box may be configured to provide a charging advisory alert to a user while they are watching video content.

In embodiments of the invention, a user's wireless communications (mobile) device may establish a wireless communications link with the user's computer or alternative device via a wireless protocol such as Bluetooth. Many types of portable communication devices such as cell phones (mobile phones), and personal digital assistants (PDA) are configured with Bluetooth, which is a short range wireless link protocol. A user's wireless communications device may also be placed into a docking cradle that has a wired connection to the user's computer. Alternatively, a data cable, such as a universal serial bus (USB), may be utilized to establish a communication link between the user's communication device and their computer or alternative device.

FIG. 1 illustrates a flow chart for providing activity pattern based battery charging alerts for mobile devices according to embodiments of the invention. The process starts (block 100) with monitoring usage patterns of a user's mobile device (cell phone, mobile computing device, PDA, etc.) (block 102), and determining periods of activity and inactivity of the mobile device (block 104). Subsequently, an activity log detailing the determined periods of activity and inactivity is created (block 106), and levels of available battery charge for the mobile device are monitored (block 108). The monitored levels of available battery charge are correlated with the activity log (block 110), and a charging advisory alert is generated in response to available battery charge dropping below a threshold value prior to a period of device inactivity, or toward the end of a period of activity (block 112), and the process concludes (block 114).

Figure 2:
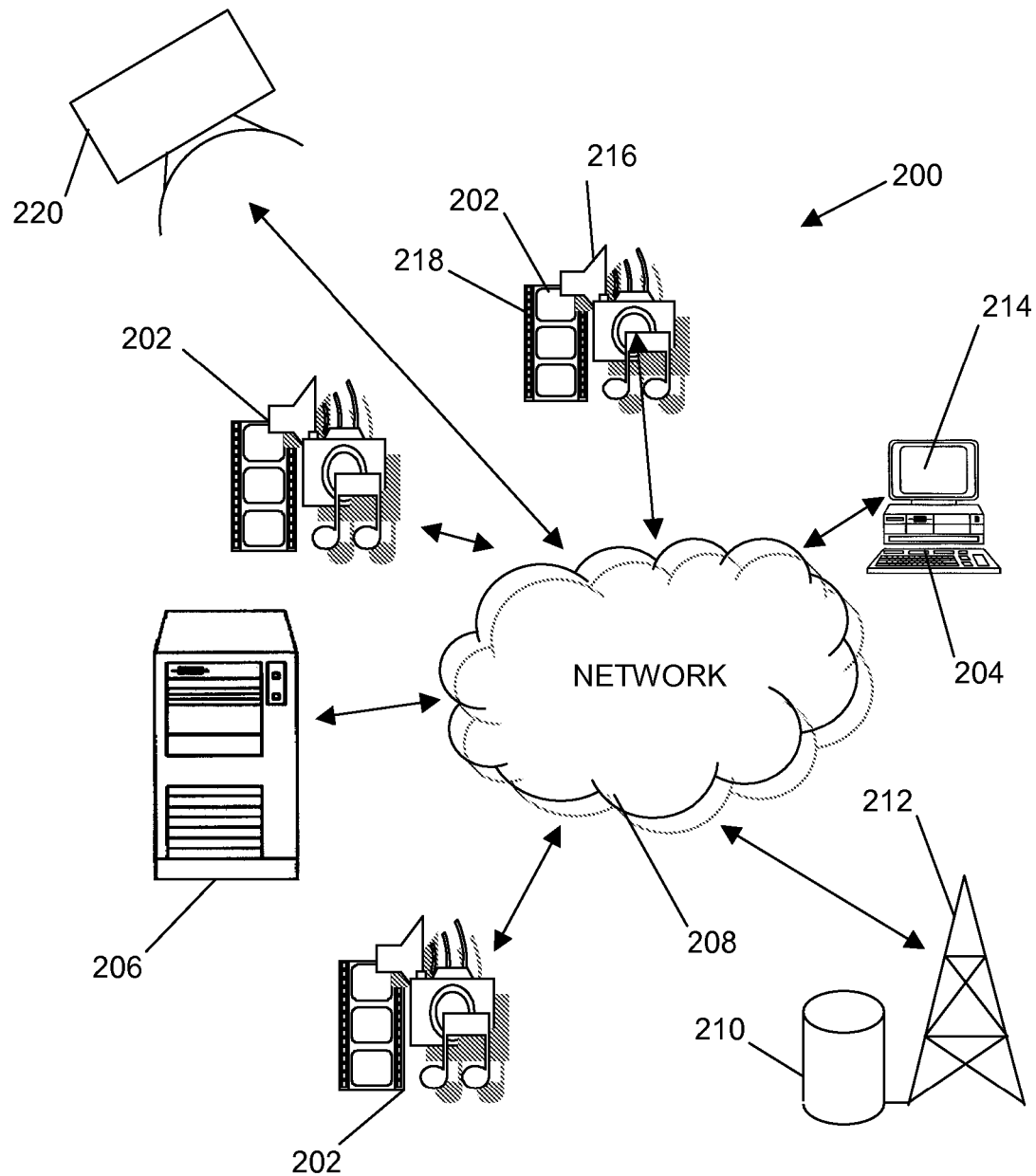
FIG. 2 illustrates a system for implementing embodiments of the invention.

FIG. 2 is a block diagram of an exemplary system 200 configured for providing activity pattern based battery charging alerts for mobile devices according to embodiments of the invention. The system 200 includes multimedia devices 202, and desktop computer devices 204 configured with display capabilities 214. The multimedia devices 202 may be mobile communication and entertainment devices, such as cellular phones and mobile computing devices that are wirelessly connected to a network 208. The multimedia devices 202 have video displays 218 and audio outputs 216. The multimedia devices 202 and desktop computer devices 204 may be configured with software with a GUI for carrying out the activity pattern based battery charging alerts of embodiments of the invention. The network 208 may be any type of known network including a fixed wire line network, cable and fiber optics, over the air broadcasts, satellite 220, local area network (LAN), wide area network (WAN), global network (e.g., Internet), intranet, etc. with data/Internet capabilities as represented by server 206. Communication aspects of the network are represented by cellular base station 210 and antenna 212. In a preferred embodiment, the network 208 is a LAN and each remote device 202 and desktop device 204 executes a user interface application (e.g., web browser) to contact the server system 206 through the network 208. Alternatively, the remote devices 202 and 204 may be implemented using a device programmed primarily for accessing network 208 such as a remote client.

The activity pattern based battery charging alert software, of embodiments of the invention, may be resident on the individual multimedia devices 202 and desktop computers 204, or stored within the server 206 or cellular base station 210.

The capabilities of the present invention can be implemented in software, firmware, hardware or some combination thereof As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method for providing activity pattern based battery charging alerts for mobile devices, wherein the method comprises: monitoring usage patterns of a mobile device at a phone service provider; determining periods of activity and inactivity for the mobile device's usage at a system level monitor from call logs received from the phone service provider, the system level monitor being separate from the mobile device; creating at the system level monitor an activity log detailing the determined periods of activity and inactivity; monitoring levels of available battery charge for the mobile device at the mobile device; providing the levels of available battery charge to the system level monitor; correlating the levels of available battery charge with the activity log; and generating at the system level monitor a charging advisory alert in response to at least one of: an available battery charge dropping below a threshold value prior to a period of device inactivity, or toward the end of a period of activity; and providing the charging advisory alert to a device other than the mobile device;

wherein the charging advisory alert is provided by the instant message (IM), short messaging service (SMS) or electronic mail (email) to the device other than the mobile device;

wherein the device other than the mobile device is a set top box configured to provide the charging advisory alert to a user while the user is watching video content.

* * * * *